US011812695B2

(12) United States Patent
Hunt et al.

(10) Patent No.: US 11,812,695 B2
(45) Date of Patent: Nov. 14, 2023

(54) HEADER HEIGHT CONTROL FOR COMBINE HARVESTER

(71) Applicant: CNH Industrial America LLC, New Holland, PA (US)

(72) Inventors: Cory Douglas Hunt, Millersville, PA (US); Madhu Pankaj, West Chester, PA (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 17/926,509

(22) PCT Filed: May 26, 2021

(86) PCT No.: PCT/US2021/034268
§ 371 (c)(1),
(2) Date: Nov. 18, 2022

(87) PCT Pub. No.: WO2021/242867
PCT Pub. Date: Dec. 5, 2021

(65) Prior Publication Data
US 2023/0134768 A1 May 4, 2023

Related U.S. Application Data

(60) Provisional application No. 63/031,934, filed on May 29, 2020.

(51) Int. Cl.
*A01D 41/14* (2006.01)
*A01D 34/00* (2006.01)
*A01D 34/28* (2006.01)

(52) U.S. Cl.
CPC ......... *A01D 41/141* (2013.01); *A01D 41/145* (2013.01); *A01D 34/008* (2013.01); *A01D 34/283* (2013.01)

(58) Field of Classification Search
CPC .. A01D 41/141; A01D 41/145; A01D 34/008; A01D 34/283
See application file for complete search history.

(56) References Cited

U.S. PATENT DOCUMENTS 5,359,836 A * 11/1994 Zeuner ................ A01D 41/141
56/208
5,577,373 A * 11/1996 Panoushek ........... A01D 41/141
56/DIG. 15

(Continued)

FOREIGN PATENT DOCUMENTS

CN 109548472 A 4/2019
DE 4406892 A1 * 9/1995 ........... A01B 63/114

(Continued)

OTHER PUBLICATIONS

International Search Report and Written Opinion for PCT Application No. PCT/US2021/034268 dated Sep. 14, 2021 (10 pages).

*Primary Examiner* — Arpad F Kovacs
(74) *Attorney, Agent, or Firm* — Peter K. Zacharias

(57) ABSTRACT

A method and apparatus for controlling a header height of a combine harvester that includes a header, a ground speed sensor, a ground height sensor configured to detect a ground contour directly beneath the header, a forward looking sensor (FLS) configured to detect a ground contour forward of the header, and a controller. The controller receives signals from the ground speed sensor, the ground height sensor and the FLS, and calculates a header height output as a function of (i) an output of the ground speed sensor, which represents a ground speed of the combine, (ii) an output of the ground height sensor, and (iii) an output of the FLS. The controller is further configured to weight the outputs of the ground height sensor and the FLS as a function of the speed of the combine harvester in calculating the header height output.

20 Claims, 5 Drawing Sheets

(56) References Cited

U.S. PATENT DOCUMENTS

| | | | | |
|---|---|---|---|---|
| 6,523,333 | B2* | 2/2003 | Metzger | A01D 41/141 56/208 |
| 6,615,570 | B2 | 9/2003 | Beck et al. | |
| 7,222,474 | B2 | 5/2007 | Rayfield et al. | |
| 8,333,057 | B2 | 12/2012 | Schroeder et al. | |
| 9,345,191 | B2* | 5/2016 | Kohlhase | A01D 34/008 |
| 9,668,412 | B2* | 6/2017 | Ritter | A01D 41/141 |
| 9,769,982 | B2 | 9/2017 | Figgins et al. | |
| 10,455,765 | B2* | 10/2019 | Seiders, Jr. | A01D 41/127 |
| 10,687,466 | B2* | 6/2020 | Reed | A01D 41/127 |
| 10,959,374 | B2* | 3/2021 | Duerksen | A01D 41/141 |
| 2003/0019196 | A1* | 1/2003 | Coers | A01D 41/127 56/10.2 G |
| 2004/0006958 | A1* | 1/2004 | Thiemann | A01D 41/141 56/10.2 R |
| 2012/0174549 | A1* | 7/2012 | Schroeder | A01D 41/141 56/10.2 E |
| 2016/0007531 | A1* | 1/2016 | Schlipf | A01D 41/14 56/10.2 E |
| 2017/0064904 | A1* | 3/2017 | Figgins | A01D 41/141 |
| 2018/0070531 | A1* | 3/2018 | Long | A01D 41/145 |
| 2018/0332768 | A1* | 11/2018 | Isaac | A01D 41/06 |
| 2019/0297775 | A1* | 10/2019 | Fuechtling | A01D 34/04 |
| 2019/0335661 | A1 | 11/2019 | Seiders, Jr. | |
| 2021/0212248 | A1* | 7/2021 | Kong | A01D 41/144 |
| 2022/0264798 | A1* | 8/2022 | Martin | A01D 41/141 |

FOREIGN PATENT DOCUMENTS

| | | | | |
|---|---|---|---|---|
| EP | 3516942 A1 * | 7/2019 | | A01B 69/004 |
| EP | 3560314 A1 * | 10/2019 | | A01D 34/283 |
| WO | WO-0165918 A1 * | 9/2001 | | A01D 41/141 |

* cited by examiner

HEADER HEIGHT CONTROL FOR COMBINE HARVESTER

FIELD OF THE INVENTION

The present invention relates to a system for adjusting a height of a header of a combine harvester based upon various factors.

BACKGROUND OF THE INVENTION

As is described in U.S. Pat. No. 7,222,474 to CNH America LLC (the '474 Patent), which is incorporated by reference in its entirety and for all purposes, the height of a header of a combine harvester is capable of being adjusted. Header height is typically adjusted depending upon the type of crop being harvested by the combine. The header height is also adjusted to conform to the changing contours of the ground. More particularly, combines typically include ground contact sensors to detect the distance between the header or cutter bar and the ground. The height of the header is adjusted based upon the input of the ground contact sensors. It is envisioned that a combine harvester could also use forward-looking sensors to determine the contours of the ground lying ahead of the combine.

When the combine is travelling at high ground speeds it would be advantageous to use sensing inputs from the forward-looking sensors to provide advanced detection of ground contours. However, when the combine is travelling at slow speeds (e.g., 5 mph or less) while traversing aggressive ground contours, the forward-looking sensors may detect contour changes too far in advance and cause the header to move upward (or downward) prematurely, thereby resulting in sub-optimal harvesting.

For combines having forward-looking sensors and ground contact sensors, it would be desirable to weight the inputs of the forward-looking and ground contact sensors as a function of the speed of the combine.

It is noted that although various features (e.g., forward looking sensors of a combine) are described in the Background section, the inclusion of such features in the Background section is not an admission that such features represent prior art.

SUMMARY OF THE INVENTION

According to one aspect of the invention, a combine harvester includes a header for harvesting crop material on the ground, a ground speed sensor configured to detect a ground speed of the combine, a ground height sensor configured to detect a contour of the ground located directly beneath the header, a forward looking sensor (FLS) configured to detect a contour of the ground forward of the header, and a controller. The controller is configured to receive signals from the ground speed sensor, the ground height sensor and the FLS, and calculate a header height output as a function of (i) an output of the ground speed sensor, which represents a ground speed of the combine, (ii) an output of the ground height sensor, which represents the contour of the ground located directly beneath the header, and (iii) an output of the FLS, which represents the contour of the ground that is forward of the header. The controller is further configured to weight the outputs of the ground height sensor and the FLS as a function of the speed of the combine harvester in calculating the header height output.

According to another aspect of the invention, a method for controlling a height of the header above the ground comprises:

receiving signals at a controller of the combine from the ground speed sensor, the ground height sensor and the FLS, calculating a header height output, using the controller, as a function of (i) an output of the ground speed sensor, which represents a ground speed of the combine, (ii) an output of the ground height sensor, which represents the contour of the ground located directly beneath the header, and (iii) an output of the FLS, which represents the contour of the ground that is forward of the header, and weighting, by the controller, of the outputs of the ground height sensor and the FLS as a function of the speed of the combine harvester in calculating the header height output.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
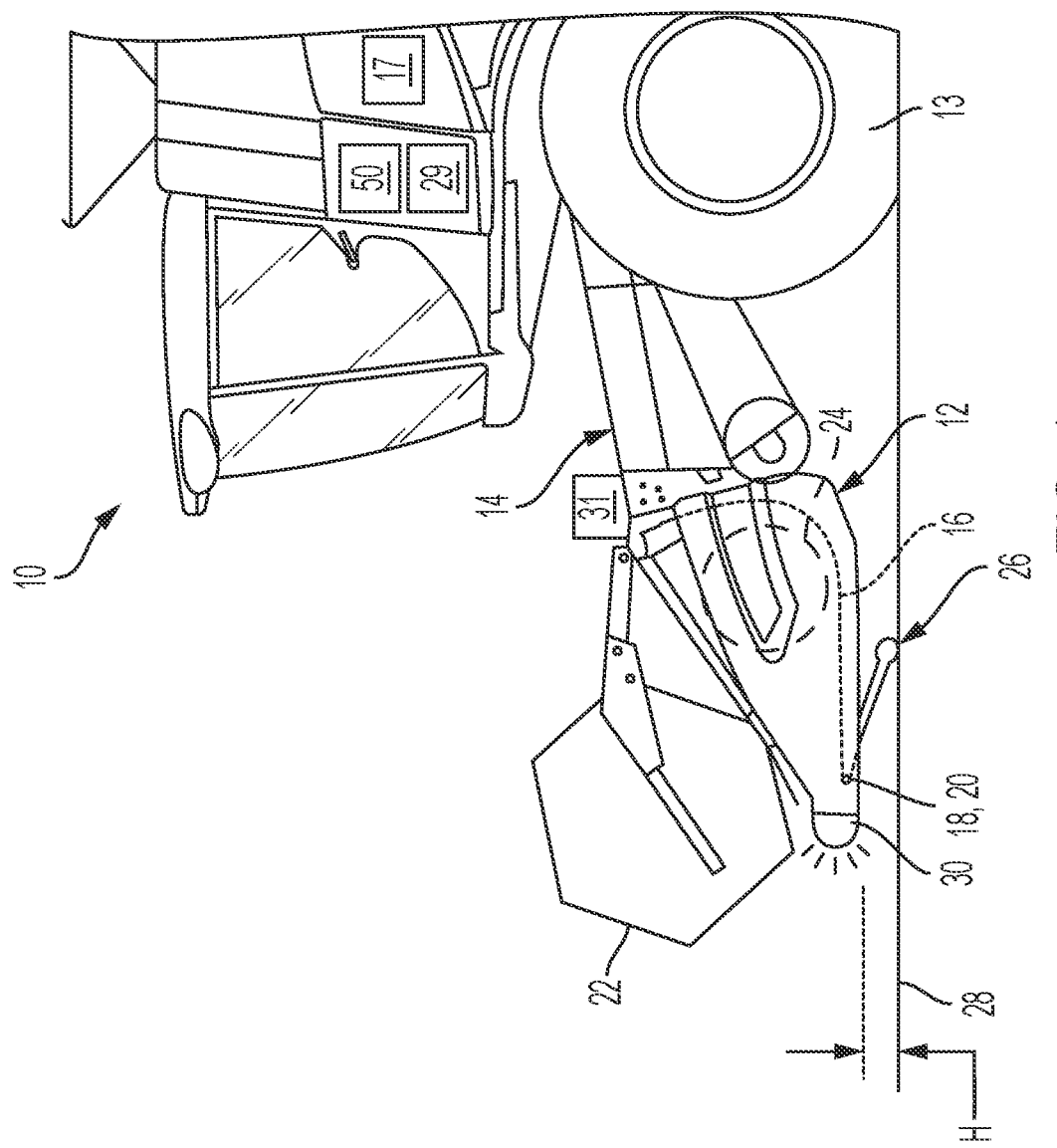
FIG. 1 is a side view of a front end of an agricultural combine harvester having a header (with a cutter bar) in a raised position above the ground, the header including a ground sensing apparatus and a forward-looking sensor.

Corresponding reference characters indicate corresponding parts throughout the several views. The exemplification set out herein illustrates an embodiment of the invention, in one form, and such exemplification is not to be construed as limiting the scope of the invention in any manner.

For convenience of reference and understanding in the following discussions, and with respect to the various drawings and their descriptions, the point of reference for the use of various terms that are hereafter employed, including "left", "right", "forward", "rearward", "front", "back", "top", and "bottom", should generally be considered to be taken from a point at the rear of the combine harvester machine facing in its normal direction of travel, unless it is clear from the discussion and context that a different point of reference is appropriate. Any use of such terms should therefore be considered exemplary and should not be construed as limiting or introducing limitations.

Moreover, inasmuch as various components and features of harvesters and fan assemblies are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Turning now to the drawings wherein a preferred embodiment of the invention is shown, in FIG. 1, a front end of an agricultural combine 10 is shown including a conventional header 12 supported on a feeder 14, for cutting or severing crops such as, but not limited to, legumes such as soybeans and small grains such as wheat, and inducting the severed crops into feeder 14 for conveyance into combine 10 for threshing and cleaning as the combine 10 moves forwardly over a field. Header 12 includes a bottom or pan 16 which is supported in desired proximity to the ground surface of the field during the harvesting operation. An elongate, sidewardly extending cutter bar 18 supporting elongate, reciprocally movable sickle knives 20 (for example) is disposed along a forward edge of pan 16. The cutter bar 18 severs the crop for induction into the header 12. An elongate, sidewardly extending reel 22 is disposed above pan 16 and is rotatable in a direction for facilitating induction of the severed crops into header 12. An elongate, rotatable auger 24 extends in close proximity to a top surface of pan 16 and has spiral flights therearound (not shown) which convey the severed crops to feeder 14 for induction into combine 10. The front wheels 13 (or tracks) of the combine 10 are shown in FIG. 1.

Combine 10 includes a ground speed sensor 17 for sensing the ground speed of the combine 10 during operation. The ground speed sensor 17 may be a speedometer, GPS, or other speed sensing device of the combine 10, as is known in the art. The ground speed sensor 17 may mounted or effectively mounted at the center axis G (FIG. 5A) of the combine 10 to determine the ground speed at the center axis G.

Header 12 is shown including a ground height sensor 26 constructed and operable according to teachings of the present invention, for sensing or contacting the ground surface 28 of a field residing directly beneath the header 12. The ground height sensor 26 is positioned either at or behind cutter bar 18. The ground height sensor 26 is configured to provide information relating to (i) the contour of the ground 28 directly beneath the header, (ii) contact with the ground, and/or (iii) the height 'H' of the cutter bar 18 (or another point on the header 12) with respect to the ground 28 at the current position of header 12, for example, to one or more controls of combine 10, such as an automatic header height control (not shown), a feeder height and/or angle control (also not shown), and/or a header tilt control (also not shown). The aforementioned controls may be managed by one or more controllers, such as the controller 50 that is described herein. The ground height sensor 26 does not necessarily have to contact the ground, and, may be a non-contact sensor that may utilize LIDAR, RADAR, or SONAR, and/or ground sensor 26 may be ultrasonic sensor or camera. Further details of the ground sensor 26 are provided in the '474 Patent.

A forwarding-looking sensor (FLS) 30 is mounted to header 12 for sensing the contours (e.g., height) of the ground 28 at a location forward of header 12. FLS 30 may utilize LIDAR, RADAR, or SONAR, and/or FLS 30 may be ultrasonic sensors or cameras. While FLS 30 may sense the elevation of ground contours that are forward of header 12, depending upon the type of FLS 30, FLS 30 does not necessarily detect the longitudinal distance to those contours. As noted above, when the combine is travelling at high ground speeds it would be advantageous to use sensing input from FLS 30 to provide advanced detection of ground contours. However, when the combine is travelling at low speed (e.g., 5 mph or less) while traversing aggressive ground contours, FLS 30 may detect contour changes too far in advance and cause header 12 to prematurely move upward (or downward) or tilt about a center axis G of the combine 10 (FIG. 5A), thereby resulting in sub-optimal harvesting.

FLS 30 and ground sensor 26 represent a "sensor pair," and are positioned at the same lateral position along the length "L" (FIG. 5A) of the header 10. The header 12 includes at least one sensor pair 26/30. The example shown in FIG. 5A, for example, includes four sensor pairs A, B, C and D positioned along the length L of the header 12. Each sensor pair A-D includes one FLS 30 and one ground sensor 26, for example. The header 12 may include any number of sensor pairs.

A motor 29 raises and lowers the feeder 14 as well as the header 12 that is connected thereto in a vertical direction, as is known in the art. Alternatively, motor 29 could raise or lower the header 12 independently of the feeder 14.

Another motor or actuator 31 rotates (i.e., tilts) the header 12 about the center axis G (FIG. 5A), as is known in the art, to compensate for uneven ground conditions. Specifically, a series of actuators 31 may be spaced apart along the length L of the header 12 for tilting the header 12.

The combine 10 further includes a controller 50 that is configured to receive signals from the sensors 26 and 30, and actuate the motor 29 and actuators 31 to raise, lower and/or tilt the header 12 based upon the signals from the sensors 26 and 30, as will be described in greater detail with reference to FIG. 2. The controller 50 incorporates automatic header height control, a feeder height and/or angle control, and/or a header tilt control.

Figure 2:
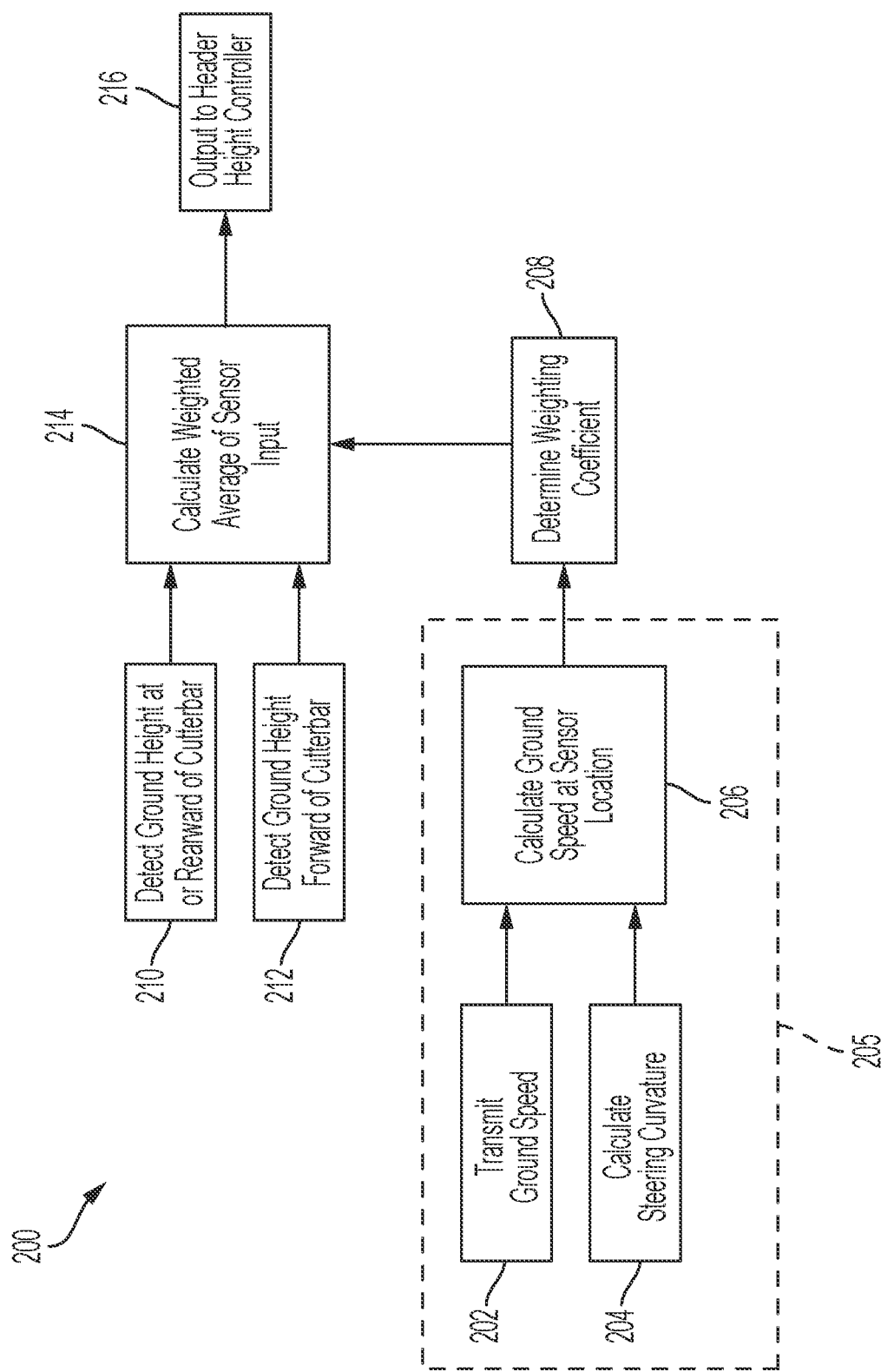
FIG. 2 is a simplified flow chart for header height control.

FIG. 2 is a simplified flow chart for header height control. The flowchart provides a method 200 for controlling the height of the header 12 relative to the ground 28. It should be understood that the method 200 described hereinafter is performed for a single sensor pair 26/30 (i.e., sensors 26 and 30 of FIG. 1), and the method 200 is repeated for every sensor pair 26/30 of the combine 10. As noted above, the sensors of a sensor pair 26/30 are positioned at the same lateral position along the length "L" (FIG. 5A) of the header 10. Also, it should be understood that the output of the method 200 may also be used to control tilt of the header 12.

According to the method 200, at step 202, the ground speed sensor 17 transmits the ground speed of the machine (i.e., combine 10) or data corresponding thereto to the controller 50. At step 204, the controller 50 calculates the steering curvature of the combine 10. At step 206, the controller 50 calculates the local ground speed at the location of the sensor pair 26/30 based upon the machine ground speed transmitted at step 202 and the steering curvature transmitted at step 204. Steps 202, 204 and 206 comprises a process 205 for calculating the local ground speed at the location of the sensor pair 26/30. The process 205 is shown in simplified form in FIG. 2, and in detailed form in FIG. 3. The process 205 will be described in greater detail with respect to FIG. 3.

Figure 4:
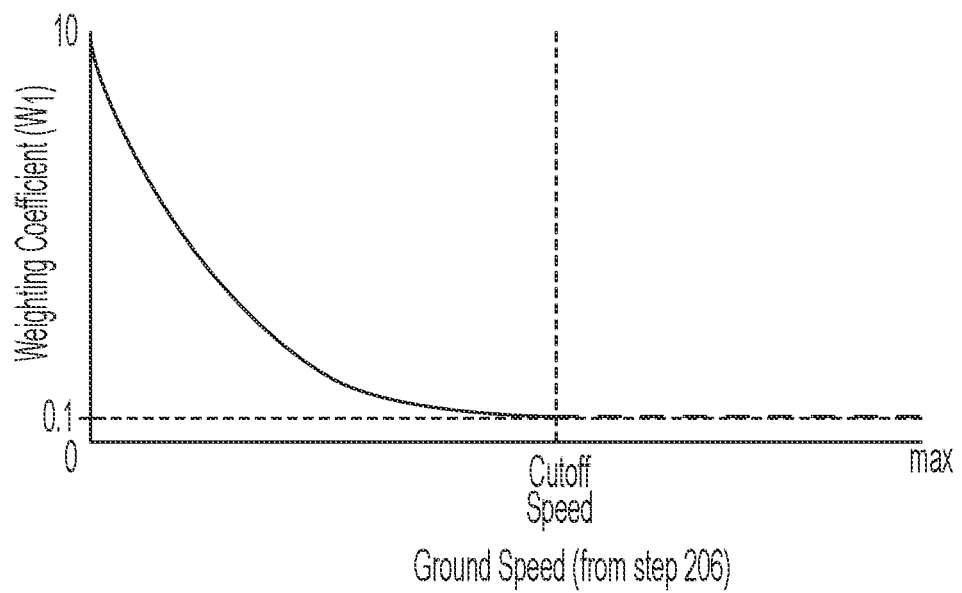
FIG. 4 is a graph showing the relationship between a weighting coefficient and ground speed.

At step 208, the controller 50 determines a weighting coefficient W1 based upon the local ground speed at the sensor pair 26/30 calculated at step 206. The weighting coefficient W1 is determined using an equation or look-up table, for example. An exemplary graph of such an equation is shown in FIG. 4. In FIG. 4, the equation is a non-linear, piecewise quadratic function, however, the equation could be linear (e.g., Y=X) without departing from the scope or spirit of the invention. Using any local ground speed (as determined at step 206), it is possible to calculate or identify a weighting coefficient W1 using the equation or look-up table. According to this example, the weighting coefficient W1 varies between 0.1 and 10, depending upon the local ground speed at the sensor pair 26/30, however, these values could vary.

The cutoff speed is identified on the graph in FIG. 4. The cutoff speed is the speed of the combine at which the function plotted on the graph transitions from a decaying value to a substantially constant value. The cutoff speed may be 5 miles per hour, for example. At the cutoff speed, the weighting coefficient W1 is 0.1. The purpose of the weighting coefficient W1 will be described in greater detail with reference to step 214.

At step 210, the output of the ground sensor 26 of the sensor pair 26/30 is transmitted to the controller 50. The output signal of the ground sensor 26 corresponds to the detected vertical distance (i.e., height) from the ground to the cutter bar 18 (for example). As noted above, ground sensor 26 is positioned either at or rearward of the cutter bar 18 of the combine 10.

At step 212, the output of the FLS 30 of the same sensor pair 26/30 is transmitted to the controller 50. As noted above, FLS 30 is positioned forward of the cutter bar 18 of the combine 10. The output signal of the FLS 30 corresponds to the ground height at some location forward of the sensor 30 (e.g., depending upon the type, configuration and resolution of the FLS 30). The output signal of the FLS 30 may be output, for example, as (i) a vertical distance between the current ground position and the ground that is forward of the sensor 30, or (ii) a vertical distance between the cutter bar 18 and the location on the ground that is forward of the sensor 30. The controller 50 is configured to manipulate the output signal, as required.

At step 214, the controller 50 calculates the weighted header height output at the lateral location of one sensor pair 26/30 along the length L of the header 12 using the function of FIG. 4 in combination with the output data of the sensors of that sensor pair 26/30. Specifically, the controller 50 calculates a weighted header height output for each sensor pair 26/30 based upon the following formula:

$$Output = (W1*Input1 + (1/W1)*Input2)/(W1 + (1/W1)),$$
where

Input1=header height value detected by ground sensor 26 of sensor pair 26/30 at step 210;

Input2=ground height value detected by FLS 30 of sensor pair 26/30 at step 212;

W1=weighting coefficient calculated at step 208; and

Output=weighted header height output at lateral location of sensor pair 26/30.

The Output will vary depending upon the signals transmitted by the sensors 26 and 30, the detected ground speed of the combine 10 transmitted by sensor 17, as well as the detected steering curvature and the lateral location of the sensor pair 26/30 on the header 12 (as will be described with reference to FIG. 3).

In calculating the Output, for speeds above the cutoff speed shown in FIG. 4, no weight (or very little weight) is given to the output of the ground sensor 26 of the sensor pair 26/30 whereas the output of the FLS 30 of the same sensor pair 26/30 is heavily weighted. Conversely, for speeds below the cutoff speed, in calculating the Output, no weight (or very little weight) is given to the output of the FLS 30 of the same sensor pair 26/30 whereas the output of the ground sensor 26 of the sensor pair 26/30 is heavily weighted. Accordingly, when the combine is travelling at slow speeds (e.g., 5 mph or less) while traversing aggressive ground contours, contours detected by FLS 30 of the sensor pair 26/30 do not cause header 12 to prematurely move upward (or downward) or tilt about axis G (FIG. 5A), which would result in sub-optimal harvesting, because the output of FLS 30 is not weighted as heavily as the output of the ground sensor 26 of that sensor pair 26/30. The different weightings are made possible due to the weighting coefficient W1, which changes the Output depending upon the speed of the combine 10.

At step 216, the Output, i.e., the weighted header height at the lateral location of sensor pair 26/30 is transmitted to controller 50.

Figure 5B:
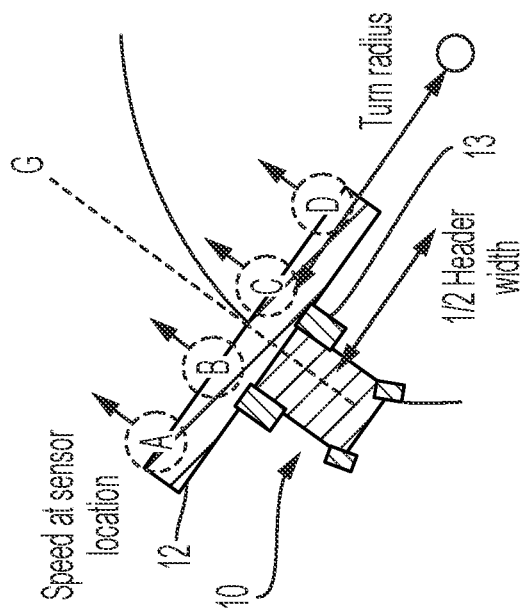
FIG. 5B is another simplified plan view of the combine of FIG. 5A shown in the course of moving or turning through a curve.
Figure 5A:
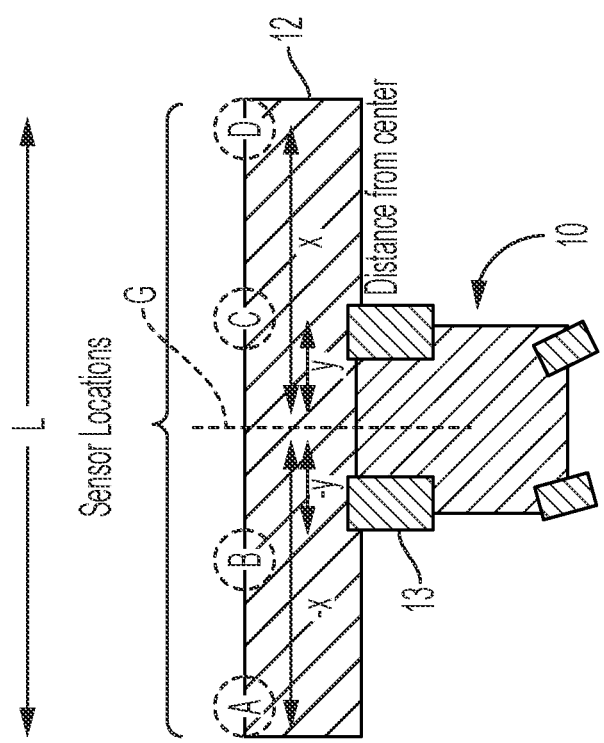
FIG. 5A is a simplified plan view of a combine and the location of forward looking sensors on the combine.

As noted above, method 200 is repeated for every sensor pair 26/30. Thus, controller 50 will receive an Output at step 216 for every sensor pair 26/30, which may include, for example, four different sensor pairs A-D, as shown in FIG. 5A. The controller 50 will then control the motor 29 and actuator 31 to raise, lower, and/or tilt the header 12 depending upon the output calculated at step 216 for every sensor pair 26/30 of the header 12.

Figure 3:
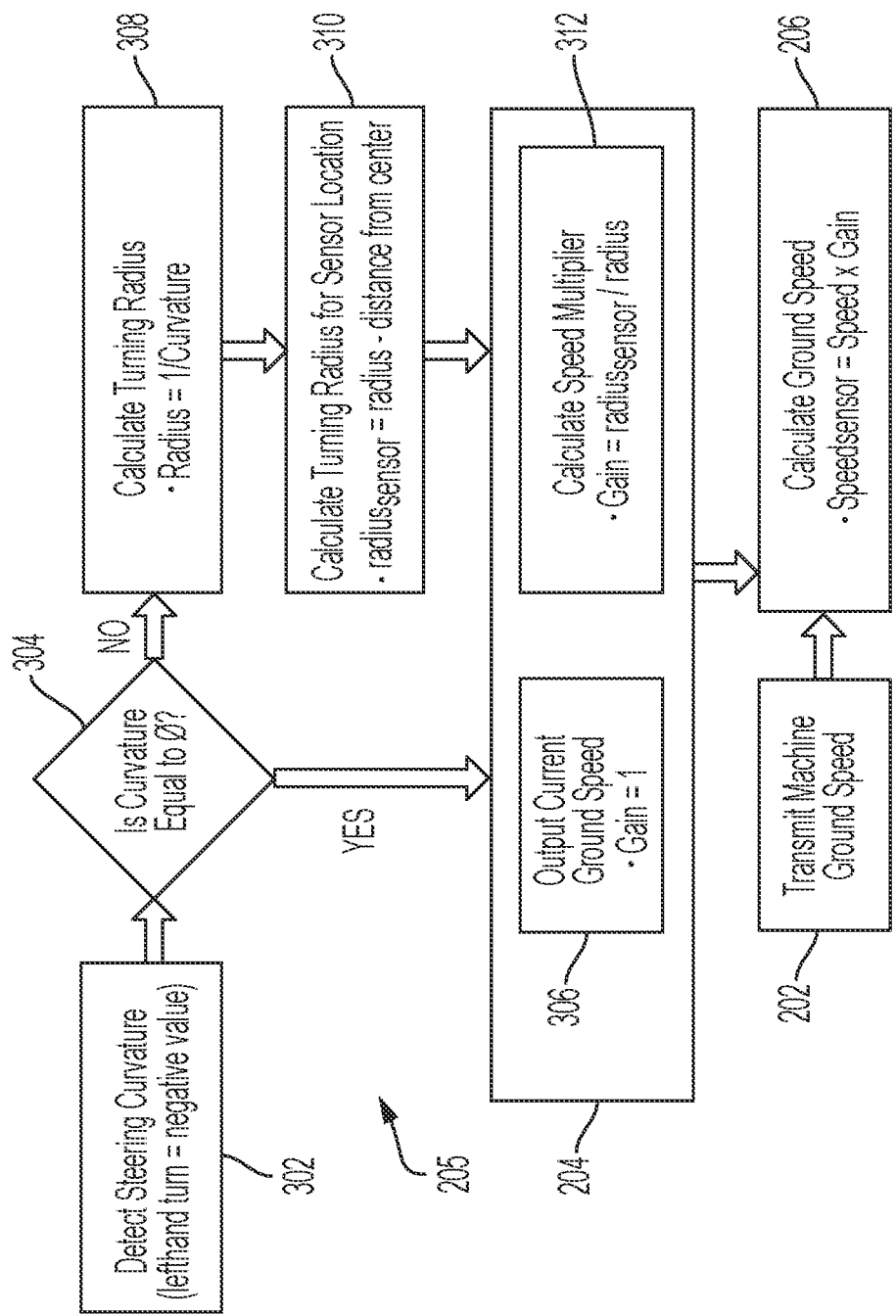
FIG. 3 is a detailed view of the steps for calculating ground speed shown in the flow chart of FIG. 2.

FIG. 3 is a detailed view of the steps of process 205 for calculating local ground speed at the sensor pair 26/30 while taking into consideration turning of the combine 10. A turning operation executed by the combine 10 is shown in FIG. 5B. As background, when the combine is driving in a straight line, all of the sensors of the sensor pairs 26/30 output the same ground speed, however, when the combine 10 turns left or right, the sensor pairs 26/30 will output a different localized ground speed. As best shown in FIG. 5B, during operation, the sensor pair D will experience a lower local ground speed than the sensor pair A given their respective locations from the center of the turning radius. As will be described hereinafter, the controller 50 will take into account those different ground speeds upon calculating ground speed. It is noted that each sensor 26 and 30 of a particular sensor pair 26/30 will experience substantially the same ground speed during the turning operation of the combine 10, however, the different sensor pairs 26/30 will experience different ground speeds during the turning operation, as detailed above.

At step 302, the controller 50 detects the steering curvature of the combine 10. The steering curvature of the combine 10 may be detected using a steering sensor or a GPS of the combine 10, or other means known to those skilled in the art for detecting turning of the combine 10.

At decision block 304, the controller 50 determines if the curvature of the combine is zero (0), and if the answer to that question is 'YES', then the method proceeds to step 306. At step 306, the controller 50 sets the Gain to a numerical value of 1. The Gain is representative of the steering curvature, thus step 306 is representative of step 204 of FIG. 2. The method then proceeds to step 206, at which point the controller 50 calculates the ground speed for the sensor pair 26/30. The ground speed for the sensor pair 26/30, which compensates for the turning radius of the combine 10, equals the product of the Gain and the machine ground speed that is calculated at step 202. For a combine 10 having a steering curvature of zero, the Gain is set to one (as noted above), thus, the ground speed for the sensor pair 26/30 is equal to the machine ground speed that is calculated at step 202. In other words, for a combine 10 having a steering curvature of zero, the ground speed for the sensor pair 26/30, which compensates for a non-existent turning radius, is simply equal to the machine ground speed that is calculated at step 202. The process 205 is then complete for that sensor pair 26/30, and the method 200 moves along to step 208 for that sensor pair 26/30, as was described with reference to FIG. 2.

Referring back to decision block 304, if the answer to the question at the decision block 304 is 'NO,' indicating that the combine 10 is executing a turning operation, then the method proceeds to step 308. At step 308, the controller 50 calculates the turning radius of the combine 10. The value of the turning radius is 1/curvature. In differential geometry, the radius of curvature, R, (turning radius) is the reciprocal of the curvature. For a curve, the radius of curvature equals the radius of the circular arc which best approximates the curve at that point. Other ways of calculating the turning radius are known to those skilled in the art and may be used in performing the method 200. At step 310, the controller 50 calculates the radiussensor, which is the turning radius of the combine at the lateral location of the particular sensor pair 26/30. To calculate the radiussensor, the controller 50 subtracts (i) the distance of the sensor pair 26/30 from the center 'G' of the combine (as shown in FIG. 5A), which may be either a positive or negative value, from (ii) the turning radius calculated at step 308. At step 312, the controller 50 calculates a speed multiplier, which is the Gain, and which is equal to radiussensor divided by the turning radius calculated at step 308. The Gain has a numerical value that is not equal to 1 (because the combine 10 is executing a turn). The Gain is representative of the steering curvature, thus step 312 is representative of step 204 of FIG. 2.

The method then proceeds to step 206, at which point the controller 50 calculates the local ground speed for the sensor pair 26/30. The local ground speed for the sensor pair 26/30, which compensates for the turning radius of the combine 10, equals the product of the Gain that is calculated at step 312 and the machine ground speed that is calculated at step 202. The process 205 is then complete for that sensor pair 26/30, and the method moves along to step 208, as was described with reference to FIG. 2.

As noted above, process 205, along with the other steps of method 200, are performed for each sensor pair 26/30.

It is to be understood that the above-described operating steps are performed by the controller 50 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 50 described herein, such as the aforementioned method of operation, is implemented in software code or instructions which are tangibly stored on the tangible computer readable medium. Upon loading and executing such software code or instructions by the controller, the controller may perform any of the functionality of the controller described herein, including any steps of the aforementioned method described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combine harvester comprising:
a header for harvesting crop material on the ground;
a ground speed sensor configured to detect a ground speed of the combine;
a ground height sensor configured to detect a contour of the ground located directly beneath the header;
a forward looking sensor (FLS) configured to detect a contour of the ground forward of the header; and
a controller configured to receive signals from the ground speed sensor, the ground height sensor and the FLS, and calculate a header height output as a function of (i) an output of the ground speed sensor, which represents a ground speed of the combine, (ii) an output of the ground height sensor, which represents the contour of the ground located directly beneath the header, and (iii) an output of the FLS, which represents the contour of the ground that is forward of the header,
said controller being further configured to weight the outputs of the ground height sensor and the FLS as a function of the speed of the combine harvester in calculating the header height output.

2. The combine harvester of claim 1, further comprising a motor or actuator for either raising or lowering the header, wherein said controller is configured to operate the motor to either raise or lower the header based upon the header height output.

3. The combine harvester of claim 1, said header including a cutter bar, the ground height sensor being configured to detect the contour of the ground located directly beneath the cutter bar, and the FLS being configured to detect the contour of the ground that is forward of the header.

4. The combine harvester of claim 1, wherein at a first ground speed of the combine, the controller is configured to weight the output of the FLS higher than the output of the ground height sensor in calculating the header height output, and at a second ground speed of the combine that is lower than the first ground speed, the controller is configured to weight the output of the ground height sensor higher than the output of the FLS in calculating the header height output.

5. The combine harvester of claim 1, wherein the FLS and the ground height sensor form a sensor pair, and the sensor pair is positioned at a same lateral location on the header.

6. The combine harvester of claim 5, further comprising a plurality of sensor pairs, wherein the sensor pairs are spaced apart along a lateral length of the header.

7. The combine harvester of claim 6, wherein the controller is further configured to calculate a header height output for each sensor pair.

8. The combine harvester of claim 7, further comprising an actuator for tilting the header, and wherein the controller is further to control the actuator based upon the header height output for each sensor pair.

9. The combine harvester of claim 7, wherein, for each sensor pair, the controller is configured to modify the output of the ground speed sensor as a function of (i) a turning radius of the combine, and (ii) a lateral location of the sensor pair along a length of the header.

10. The combine harvester of claim 1, wherein, in weighting of the outputs of the ground height sensor and the FLS, the controller is configured to utilize either a function or a look-up table that provides different weighting coefficients for various ground speeds of the combine.

11. The combine harvester of claim 1, wherein the controller is configured to calculate the header height output based upon the formula:

$$\text{Output}=(W_1*\text{Input}_1+(1/W_1)*\text{Input}_2)/(W_1+(1/W_1)),$$

wherein

Input$_1$ is the output of the ground height sensor;
Input$_2$ is the output of the FLS;
$W_1$ is a weighting coefficient that is a function of the ground speed; and
Output is the header height output.

12. The combine harvester of claim 1, wherein the ground height sensor is configured to directly contact the ground and the FLS is not configured to contact the ground.

13. In a combine including a header for harvesting crop material on the ground, a ground speed sensor configured to detect a ground speed of the combine, a ground height sensor configured to detect a contour of the ground located directly beneath the header, and a forward looking sensor (FLS) configured to detect a contour of the ground forward of the header, a method for controlling a height of the header above the ground comprises:

receiving signals at a controller of the header or the combine from the ground speed sensor, the ground height sensor and the FLS, calculating a header height output, using the controller, as a function of (i) an output of the ground speed sensor, which represents a ground speed of the combine, (ii) an output of the ground height sensor, which represents the contour of the ground located directly beneath the header, and (iii) an output of the FLS, which represents the contour of the ground that is forward of the header, and weighting, by the controller, of the outputs of the ground height sensor and the FLS as a function of the speed of the combine harvester in calculating the header height output.

14. The method of claim 13, the method comprises calculating the header height output based upon the formula:

$$\text{Output}=(W1*\text{Input}1+(1/W1)*\text{Input}2)/(W1+(1/W1)),$$

where

Input$_1$ is the output of the ground height sensor;
Input$_2$ is the output of the FLS;
$W_1$ is a weighting coefficient that is a function of the ground speed; and
Output is the header height output.

15. The method of claim 13, wherein the combine further includes a motor or actuator for either raising or lowering the header, and the method further comprises operating the motor to either raise of lower the header based upon the header height output.

16. The method of claim 13, wherein at a first ground speed of the combine, the method comprises weighting the output of the FLS higher than the output of the ground height sensor in calculating the header height output, and at a second ground speed of the combine that is lower than the first ground speed, the method comprises weighting the output of the ground height sensor higher than the output of the FLS in calculating the header height output.

17. The method of claim 13, wherein the FLS and the ground height sensor form a sensor pair, and the sensor pair is positioned at a same lateral location along a length of the header.

18. The method of claim 17, further comprising a plurality of sensor pairs, wherein the sensor pairs are spaced apart along a lateral length of the header.

19. The method of claim 18, the method comprises calculating a header height output for each sensor pair.

20. The method of claim 18, wherein for each sensor pair, the method further comprises modifying the output of the ground speed sensor as a function of (i) a turning radius of the combine, and (ii) a lateral location of the sensor pair along a length of the header.

* * * * *